United States Patent [19]

Nixon

[11] Patent Number: 4,526,275
[45] Date of Patent: Jul. 2, 1985

[54] TRANSMISSION SEALING APPARATUS

[76] Inventor: David A. Nixon, 209 Jug Broome Rd., Monroe, N.C. 28110

[21] Appl. No.: 617,024

[22] Filed: Jun. 4, 1984

[51] Int. Cl.³ .............................................. B25B 11/00
[52] U.S. Cl. ................................ 206/231; 16/114 R; 81/3 R; 138/89; 138/91; 206/319; 206/335; 269/47; 81/489
[58] Field of Search ............. 16/110 R, 111 R, 114 R, 16/124, 125, DIG. 12, DIG. 24, DIG. 39; 81/3 R; 138/89, 91; 206/223, 231, 318, 319, 335; 269/47, 50, 52; 294/27 R, 149, 158, 165, 170

[56] References Cited

U.S. PATENT DOCUMENTS

| | | | |
|---|---|---|---|
| 518,008 | 4/1894 | Riling | 138/89 |
| 834,152 | 10/1906 | Murphy | 16/125 |
| 2,645,258 | 7/1953 | Blakely | 206/318 |
| 2,707,819 | 5/1955 | Silliman | 269/50 |
| 2,885,165 | 5/1959 | Smolen | 269/47 |
| 3,814,135 | 6/1974 | Hetzer et al. | 138/89 |
| 4,153,130 | 5/1979 | Hacker | 138/89 |
| 4,249,577 | 2/1981 | Davis | 138/89 |
| 4,286,629 | 1/1981 | Streich et al. | 138/89 |
| 4,475,737 | 10/1984 | Cook, Jr. et al. | 206/318 |

Primary Examiner—William T. Dixson, Jr.
Assistant Examiner—Jimmy G. Foster
Attorney, Agent, or Firm—Don J. Flickinger

[57] ABSTRACT

A seal kit for preventing the loss of transmission fluid when servicing and/or storing an automatic transmission includes first and second plugs and a retaining strap. The first plug seals the aperture which normally receives the transmission's dipstick. The second plug seals the aperture which is formed when the rearward portion of the transmission is disconnected from the vehicle's drive shaft. This plug has a handle portion and a hollow cylindrical shank having a smooth outer surface which is engaged by the lip seal surrounding this aperture. Finally, a retaining strap having apertures in opposite ends thereof which align with apertures in a flange at the transmission's forward end is secured by means of bolts for example across the forward end of the transmission to secure the torque converter contained therein when the transmission is disconnected from the vehicle's bell housing.

11 Claims, 15 Drawing Figures

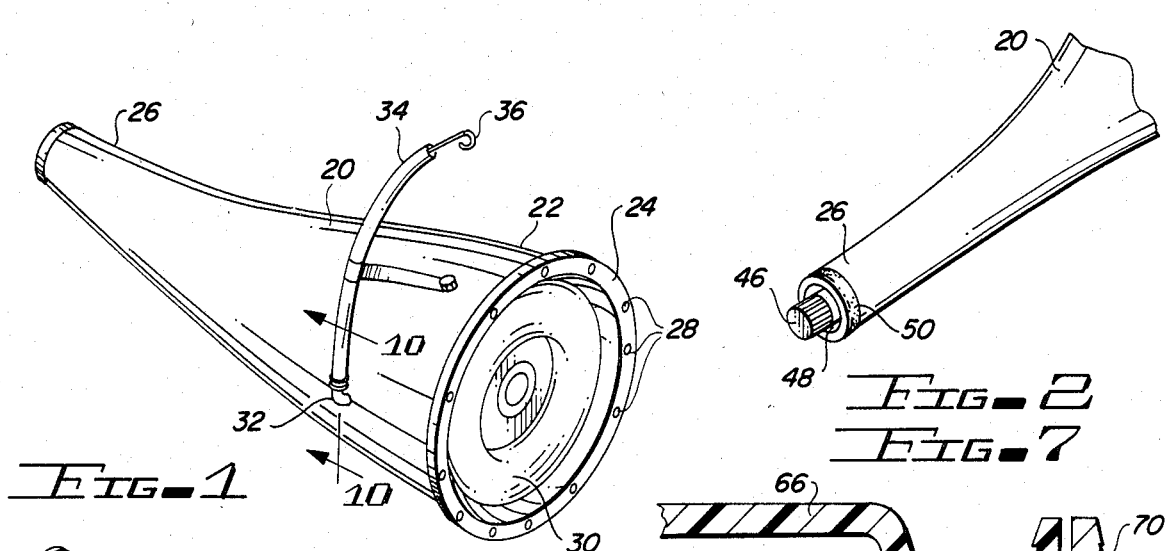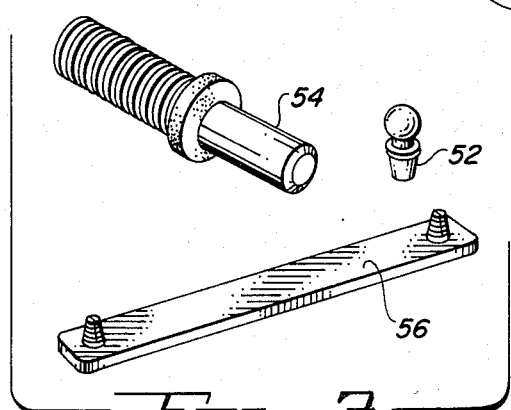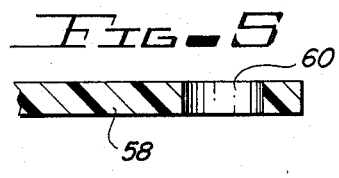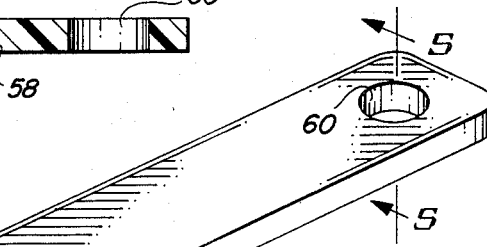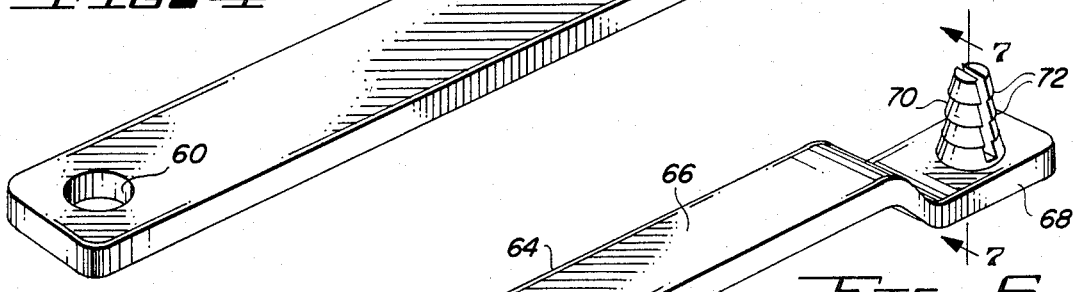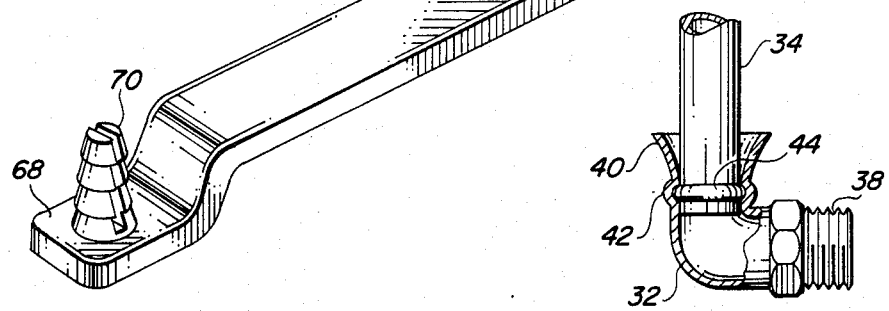

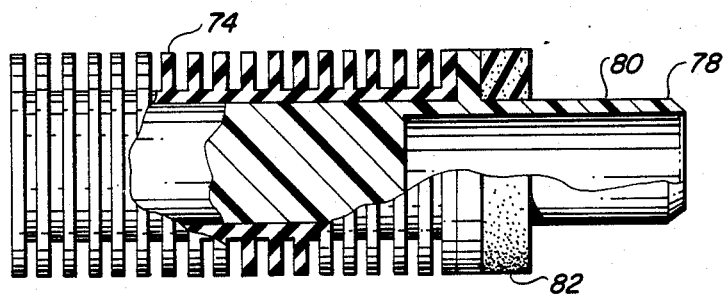
FIG-13
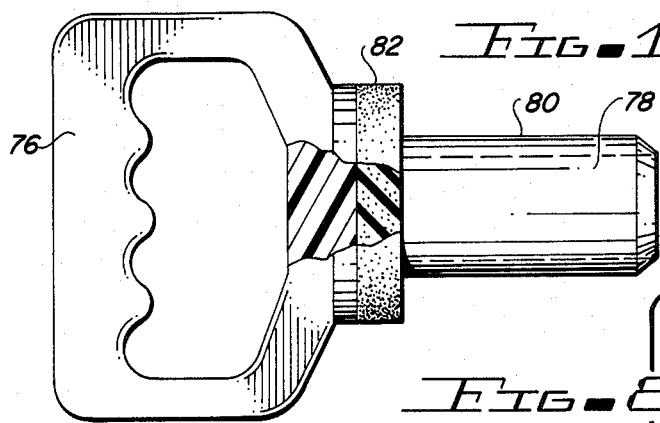
FIG-14
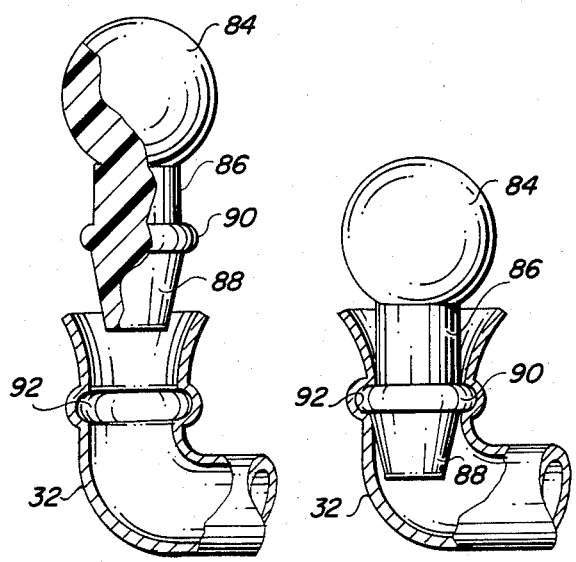
FIG-11   FIG-12
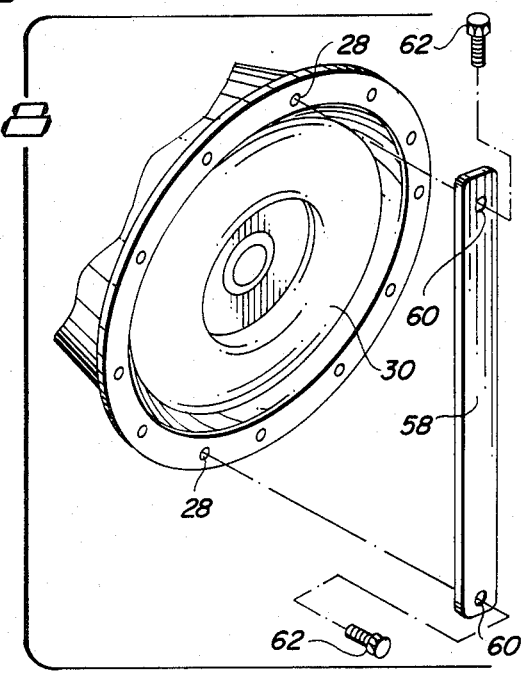
FIG-8
FIG-9
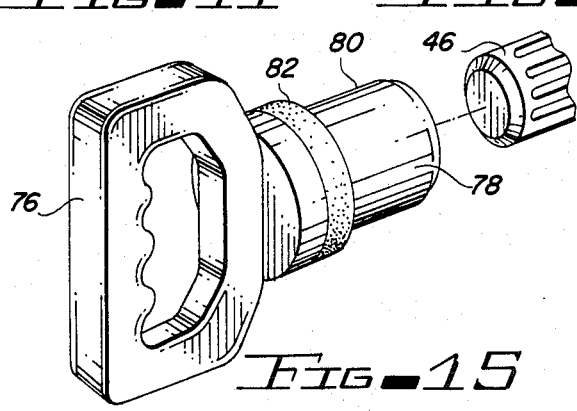
FIG-15

4,526,275

TRANSMISSION SEALING APPARATUS

BACKGROUND OF THE INVENTION

This invention relates generally to apparatus for use in conjunction with servicing and storing automatic transmissions and, more particularly, to a kit for sealing an automatic transmission.

A significant problem is encountered when removing or servicing automatic transmissions of the types used in automobiles and pickup trucks. That is, it is generally necessary to disconnect the vehicle's drive shaft from the transmission associated therewith. This creates an opening through which a substantial amount of transmission fluid may be lost. Also, automatic transmissions normally have a fitting which is coupled to a tubular housing through which a dipstick penetrates for the well known purpose of measuring the amount of transmission fluid in the transmission. This represents another opening through which transmission fluid may be lost during servicing and storage. Furthermore, if it should become necessary to disconnect the transmission from the engine's bell housing, the torque converter would be free to fall from within the transmission's housing resulting in the loss of additional transmission fluid.

Automatic transmission fluid is relatively expensive and therefore losses thereof should be held to a minimum during servicing. Furthermore, if the transmission is stored for a sufficient length of time without transmission fluid, all of the transmission's seals will dry rendering them brittle and unserviceable.

SUMMARY OF THE INVENTION

It is an object of the present invention to provide apparatus for use in conjunction with an automatic transmission for preventing the loss of transmission fluid during servicing and storage.

It is a further object of the present invention to provide a sealing kit which is inexpensive and disposable for use in sealing the openings of a transmission so as to prevent the loss of transmission fluid therethrough when the transmission is disconnected from an engine's drive shaft and bell housing.

It is a still further object of the present to provide improved apparatus for sealing the opening at the rearward end of an automatic transmission when it is disconnected from the drive shaft of a vehicle so as to prevent the loss of transmission fluid therethrough.

Yet another object of the present invention is to provide an improved plug for sealing the dipstick opening of an automatic transmission so as to prevent the loss of transmission fluid therethrough during servicing and/or storage.

A still further object of the present invention is to provide securing apparatus for securing the torque converter within the housing of an automatic transmission which has been disconnected from an engine's bell housing.

According to a broad aspect of the invention there is provided a seal kit for preventing the loss of transmission fluid when servicing an automatic transmission of the type used in a vehicle having a drive shaft and a bell housing, the transmission including a first aperture through which a dipstick may be inserted, a second aperture in a rearward end of the transmission when the rearward end is disconnected from the drive shaft, and a torque converter which is free to fall from a forward end of the transmission when the forward end is disconnected from the bell housing. The seal kit comprises a first plug for sealing the first aperture to prevent the loss of transmission fluid therefrom, a second plug for sealing the second aperture when the transmission is disconnected from the drive shaft, and a restraining means for coupling across the forward end when the transmission is disconnected from the bell housing to secure the torque converter.

The above and other objects, features, and advantages of the present invention will be more clearly understood from the following detailed description taken in conjunction with the accompanying drawings, in which:

BRIEF DESCRIPTION OF THE DRAWINGS

FIG. 1 is a frontal perspective view of a typical automatic transmission of the type normally used in automobiles and pickup trucks;

FIG. 2 is a perspective view of the rearward end of the automatic transmission shown in FIG. 1;

FIG. 3 is a perspective view illustrating the inventive kit for sealing an automatic transmission during servicing and/or storage including first and second plugs and a retainer bar;

FIG. 4 is a perspective view of a first embodiment of retainer bar in accordance with the teachings of the present invention;

FIG. 5 is a cross sectional view of the retainer bar shown in FIG. 4 taken along the line 5—5;

FIG. 6 is a perspective view of a second embodiment of retainer bar in accordance with the teachings of the present invention;

FIG. 7 is a cross sectional view of the retainer bar shown in FIG. 6 taken along the line 7—7;

FIG. 8 illustrates how the retainer bar shown in FIG. 4 is coupled to the front portion of the automatic transmission shown in FIG. 1 so as to secure the torque converter therein;

FIG. 9 illustrates how the retainer bar shown in FIG. 6 is coupled to the front end of the automatic transmission shown in FIG. 1 to secure the torque converter therein;

FIG. 10 is a cross sectional view of an L-shaped fitting which is coupled through the housing of the automatic transmission and from which extends a dipstick tube;

FIGS. 11 and 12 are cross sectional views of the L-shaped fitting shown in FIG. 10 as they would be sealed by a plug in accordance with the teachings of the present invention;

FIG. 13 illustrates a first embodiment of a plug for sealing the rearward end of the transmission shown in FIG. 1 after it has been disconnected from the vehicle's drive shaft; and FIGS. 14 and 15 are side and perspective views of a second embodiment of plug used to seal the rearward end of the transmission shown in FIG. 1 after disconnection from the vehicle's drive shaft.

DESCRIPTION OF THE PREFERRED EMBODIMENT

FIG. 1 is a frontal perspective view of a typical automatic transmission including a housing 20 which tapers from a large, cylindrical forward portion 22 including flange 24 and which tapers to a smaller rearward end 26. Flange 24 is matingly received against the bell housing of the engine (not shown) and is normally secured thereto by means of bolts passing through openings 28. Forward end 22 in conjunction with the bell housing encloses torque converter 30. An L-shaped fitting 32 projects from the side of housing 20 and supports a tubular housing 34 through which a dipstick 36 projects. The L-shaped fitting 32 is shown in more detail in FIG. 10 and includes an externally threaded portion 38 which threadably engages housing 20 and an upper flared portion 40 which receives tube 34 as can be seen, flared portion 40 includes a region of larger diameter 42 which matingly receives ring 44 coupled through the end of tube 34.

Referring to FIG. 2, an externally splined shaft 46 extends past the rearward end 26 of housing 20 which, under normal operating conditions will engage an internally splined drive shaft. The aperture 48 which results from disconnecting the drive shaft from the transmission generally includes an annular sealing means such as a lip seal 50 through which the internally splined end portion of a drive shaft is inserted to engage the externally splined end portion 46 of the transmission output shaft. The lip seal engages the outer surface of the drive shaft to prevent the loss of transmission fluid or oil from within housing 20.

The elements of the inventive sealing apparatus shown in FIG. 3 include a first plug 52 for sealing the opening in L-shaped fitting 32 when tube 34 has been removed therefrom, a second plug 54 for sealing the aperture in the rearward portion of the transmission after the drive shaft has been disconnected, and a retaining bar 56 for securing torque converter 30 within the forward portion of the transmission after it has been disconnected from the bell housing. Each of these elements will be discussed further hereinbelow.

FIGS. 4 and 5 illustrate a first embodiment of a retainer for securing torque converter 30. It includes an elongate strap 58 having apertures 60 extending therethrough at opposite ends of the strap. This retaining apparatus may be used to prevent separation of torque converter 30 from the forward portion of the transmission by passing bolts 62 through apertures 60 and threadably engaging apertures 28 in flange 24 as is shown in FIG. 7. In the case where apertures 28 in flange 24 are not threaded, apertures 60 in retaining apparatus 58 may be threaded and the device secured by passing bolts through flange 24 from its rearward side and threadably engaging apertures 60.

FIGS. 6 and 7 illustrate an alternate embodiment of retaining apparatus for securing torque converter 30. It includes a strap 64 having a central recessed portion 66 and end portions 68 each end portion 68 is provided with a clip 70 which is in the form of a bifurcated, generally frustoconical element having several rows of encircling ridges 72. Strap 64 extends across the open forward end of the transmission and its clips 70 are wedged into openings 28 in flange 24 as is shown in FIG. 9.

FIGS. 13 and 14 illustrate alternate embodiments of a plug for sealing aperture 48 in the rearward portion of the transmission after the drive shaft has been disconnected. Each includes handle portions 74 and 76 respectively each coupled to a cylindrical hollow shank 78 having a smooth surface 80. As is shown in FIG. 15, the externally splined output shaft 46 of the transmission is received within shank 78. Lip seal 50 shown in FIG. 2 then engages smooth surface 80 to complete the seal. Additional sealing washers 82 may also be employed.

Finally, FIGS. 11 and 12 illustrate a second plug in its extracted and inserted positions respectively for sealing L-shaped fitting 32. As can be seen, the plug includes a rounded handle portion 84 coupled to a shank 86 having a tapered end 88. At the point where the shank starts to taper, there is a region of larger diameter 90 which is of sufficient resiliency so as to be urged into chamber 92 and to be matingly and resiliently received thereby. Region 90 acts as a sealing ring to prevent transmission fluid from escaping through the fitting.

Thus, by sealing L-shaped fitting 32, aperture 48 in the rearward portion of the transmission housing and by securing torque converter 30 housed within the forward portion of the transmission, loss of transmission fluid has been substantially minimized and the transmission may be stored for long periods of time without fear of drying the seals.

The above description is given by way of example only. Changes in form and details may be made by one skilled in the art without departing from the scope of the invention as defined by the appended claims.

I claim:

1. A seal kit for preventing the loss of transmission fluid when servicing an automatic transmission of the type used in a vehicle having a drive shaft and a bell housing, said transmission including:
   (i) a first aperture through which a dipstick may be inserted,
   (ii) a second aperture in a rearward end of said transmission when said rearward end is disconnected from said drive shaft, and
   (iii) a torque converter which is free to fall from a forward end of said transmission when said forward end is disconnected from said bell housing, said seal kit comprising:
   a first plug for sealing said first aperture to prevent the loss of transmission fluid therefrom;
   a second plug for sealing said second aperture when said transmission is disconnected from said drive shaft; and
   restraining means for coupling across said forward end when said transmission is disconnected from said bell housing to secure said torque converter.

2. A seal kit according to claim 1 wherein said first plug comprises:
   a grip; and
   a shank coupled to said grip and having a tapered end portion.

3. A seal kit according to claim 2 wherein said transmission is provided with an L-shaped fitting having a threaded portion for threadably engaging said first aperture and a flared portion terminating with a first annular region of larger diameter and wherein the shank portion of said first plug is provided with a second annular region of larger diameter which is matingly received by said first annular region.

4. A seal kit according to claim 3 wherein said first plug is plastic.

5. A seal kit according to claim 1 wherein said second aperture is provided with annular seal means therearound and wherein said second plug comprises:
   a handle; and
   a cylindrical shank coupled to said handle and having a smooth outer shank for engaging said seal means when said shank is placed in said second aperture.

6. A seal kit according to claim 5 wherein the output shaft of said transmission extends through said second aperture and wherein the cylindrical shank of said second plug is hollow for receiving the end of said output shaft.

7. A seal kit according to claim 6 wherein said second plug is plastic.

8. A seal kit according to claim 1 wherein the forward end of said transmission terminates in a flange having a plurality of apertures therethrough and wherein said restraining means includes:
   a restraining strap having an aperture in each end thereof which align with the apertures in said flange; and
   fastening means for passing through the apertures in said flange and align apertures in said strap to secure said strap across said forward end and restrain said torque converter.

9. A seal kit according to claim 8 wherein said strap has a central recess portion for extending into said forward end.

10. A seal kit according to claim 9 wherein the apertures in said strap are internally threaded.

11. A seal kit according to claim 10 wherein said restraining means is plastic.

* * * * *